(12) United States Patent
Fukuda (10) Patent No.: US 6,839,838 B2
(45) Date of Patent: Jan. 4, 2005

(54) DATA MANAGEMENT SYSTEM, INFORMATION PROCESSING APPARATUS, AUTHENTIFICATION MANAGEMENT APPARATUS, METHOD AND STORAGE MEDIUM

(75) Inventor: Yasuo Fukuda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 844 days.

(21) Appl. No.: 09/791,844

(22) Filed: Feb. 26, 2001

(65) Prior Publication Data

US 2001/0042046 A1 Nov. 15, 2001

(30) Foreign Application Priority Data

Mar. 1, 2000 (JP) ...................................... 2000-056146

(51) Int. Cl.⁷ ................................................ G06F 1/24
(52) U.S. Cl. ...................... 713/168; 713/182; 713/189; 713/193; 713/200; 713/201
(58) Field of Search ............................... 713/168, 182, 713/189, 193, 200, 201

(56) References Cited

U.S. PATENT DOCUMENTS 5,864,683 A * 1/1999 Boebert et al. ............. 709/249
5,873,083 A * 2/1999 Jones et al. ..................... 707/4
5,884,312 A * 3/1999 Dustan et al. ................ 707/10

* cited by examiner

Primary Examiner—Thomas R. Peeso
(74) Attorney, Agent, or Firm—Fitzpatrick, Cella, Harper & Scinto

(57) ABSTRACT

A data management system for managing data on a network in which a client device which requests data management transmits encrypted data obtained by encrypting data by a key for the client device, then a server device receives the encrypted data and stores multi-encrypted data obtained by encrypting the encrypted data by a key for the server device. The client device and the server device respectively have a key encrypted by a key for an authentication management device, and the devices can decrypt the key for the client device and the key for the server device and refer to the decrypted keys by referring to the key for the authentication management device. In this arrangement, when reference to the key for the authentication management device is disabled, the key for the server device cannot be referred to, accordingly, the encrypted data cannot be obtained by decrypting the multi-encrypted data. Further, as the key for the client device cannot be referred to, the data cannot be obtained by decrypting the encrypted data. Accordingly, the disabled reference to the key for the authentication management device is equivalent to disposal of the data.

21 Claims, 5 Drawing Sheets

DATA MANAGEMENT SYSTEM, INFORMATION PROCESSING APPARATUS, AUTHENTIFICATION MANAGEMENT APPARATUS, METHOD AND STORAGE MEDIUM

FIELD OF THE INVENTION

This present invention relates to a data management system and method for managing and protecting data, which is exchanged by a client and server that are capable of sending and receiving data, by public and private keys, and to a storage medium storing program modules for implementing this method.

BACKGROUND OF THE INVENTION

A data management system for storing user data into a management side's large capacity memory via a network is known.

In case of conventional system where a custodian holds a user's "article", when the user asks the custodian to dispose of the article, the custodian simply discards the article itself. However, in the data management system as above, since data can be easily duplicated, even if data is deleted, an unauthorized duplication of the data might be stored in the memory. It is very difficult for the management side to prove that the data has been deleted, and it is also very difficult for the user to verify the deletion of the data.

SUMMARY OF THE INVENTION

According to the present invention, in a data management system for managing data on a network, a client device that requests data management transmits encrypted data obtained by encrypting data by a key for the client device, and a server device that receives the encrypted data stores multi-encrypted data obtained by encrypting the received data by a key for the server device. The client device and the server device respectively have a key encrypted by a key for authentication management device. The key for the client device and the key for the server device can be decrypted and referred to, by referring to the key for the authentication management device.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENT

A preferred embodiment of the present invention will now be described in detail in accordance with the accompanying drawings.

<Description of Encryption Scheme>

The encryption scheme applied in this invention is described below. Encryption schemes can be classified broadly into a common-key encryption scheme and a public-key encryption scheme.

In accordance with the former common-key encryption scheme, sides that transmit and receive data are provided beforehand with common-key data, data is encrypted on the transmitting side by the common-key data, and the encrypted data is delivered to the receiving side. The receiving side uses the common-key data to obtain the decrypted data of the encrypted data.

The common-key encryption scheme, however, has the following drawbacks:

(1) a problem relating to delivery of the key data (i.e., how the key should be delivered); and (2) the principle used in encryption is comparatively easy to discover.

The public-key encryption scheme, on the other hand, uses a pair of keys, namely a private key and a public key. The private key is a key kept private so that it cannot be acquired by another party, and the public key that is capable of being readily acquired by another party, respectively.

The public-key encryption scheme is characterized by the following:

(1) data that has been encrypted by a private key can be decrypted by a public key which makes a pair with the private key; and (2) data that has been encrypted by a public key can be decrypted by private key which makes a pair with the public key.

In the case(1), if the data transmitting side has transmitted data upon encrypting the data by a private key, the encrypted data can be decrypted by the public key which makes a pair with the private key. Since the data can be used as a so-called electronic signature, a person who transmitted the data can be specified.

In the case(2), if a transmitting side has transmitted data upon encrypting the data by a public key, it is possible for the encrypted data to be decrypted only by the data receiving side having a private key, which makes a pair with the public key, on the data receiving side.

The public-key encryption scheme is such that the encryption/decryption processing generally takes more time than is the case with the common-key encryption scheme. For this reason, use is also being made of a scheme, defined broadly as a public-key encryption scheme, in which the data encryption/decryption itself is performed by common-key encryption, using a common key, and the common key is encrypted/decrypted by public-key encryption. Therefore, in this invention, the defined broadly as a public-key encryption scheme is also included in the public-key encryption scheme.

First Embodiment

Figure 1:
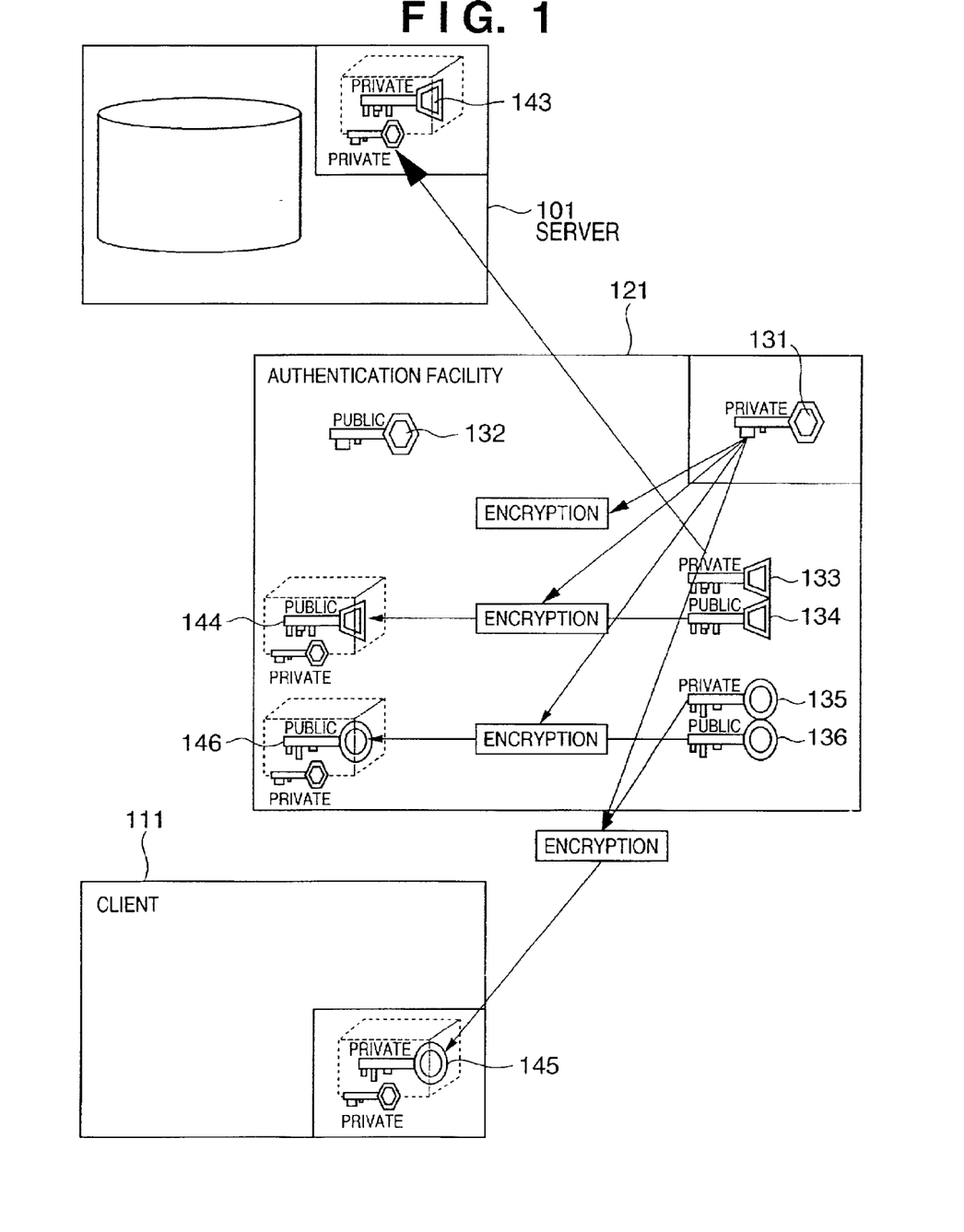
FIG. 1 is a diagram illustrating the configuration of a system embodying the present invention.

FIG. 1 is a diagram showing the configuration of a data management system according to the present invention.

The system includes a server 101, which is provided by a entrepreneur, for managing data. A client 111 of the user's, which requests data management to the entrepreneur. An authentication facility 121, for example a personal computer serving, interposed as a third party via a network between the server 101 and client 111 to generate and encrypt public and private keys for the server and client. It is assumed that the authentication facility 121 can be trusted fully with regard to the handling of the keys.

First, before data is transmitted for requesting management from the client 111 to the server 101, the authentication facility 121 generates three pairs of keys, namely a private key 131 and a public key 132 for the authentication facility 121, a private key 133 and a public key 134 for the server 101, and a private key 135 and a public key 136 for the client 111.

Next, using the private key 131 for the authentication facility 121, the authentication facility 121 encrypts the private key 133 and public key 134 of the server 101 and the private key 135 and public key 136 of the client 111 to create, respectively, an encrypted private key 143 and an encrypted public key 144 for the server 101 and an encrypted private key 145 and an encrypted public key 146 for the client 111.

Next, the authentication facility 121 transmits the encrypted private key 143 for the server 101 to the server 101, transmits the encrypted private key 145 for the client 111 to the client 111 and makes public the public key 132 for the authentication facility 121, the encrypted public key 144 for the server 101 and the encrypted public key 146 for the client 111 in such a manner that these keys can readily be acquired as through the network, by way of example.

Figure 2:
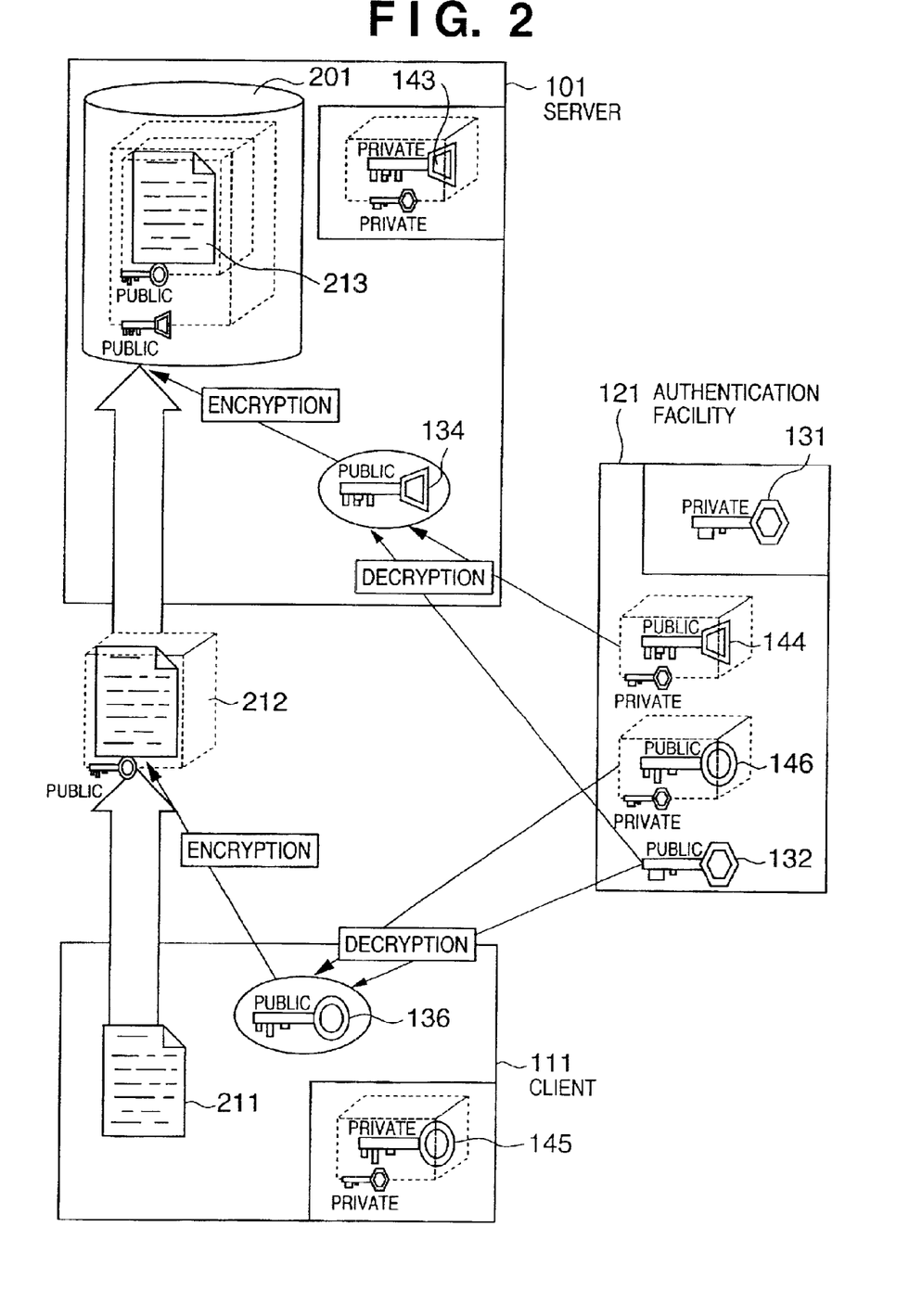
FIG. 2 is a diagram useful in describing data registration processing.

FIG. 2 is a diagram illustrating processing executed when the client 111 actually requests the server 101 to manage data.

In FIG. 2, the server 101, client 111, authentication facility 121, the private and public keys 131 to 136 and the encrypted public and private keys 143 to 146 are the same as those described above in connection with FIG. 1.

The server 101 has a storage device 201 for storing and managing data. The storage device 201, which is constituted by a memory in a computer system or by a database system, is capable of storing data by management request from the client 111.

The client 111 has data 211, encrypts the data 211 and transmits to the server 101.

Figure 3:
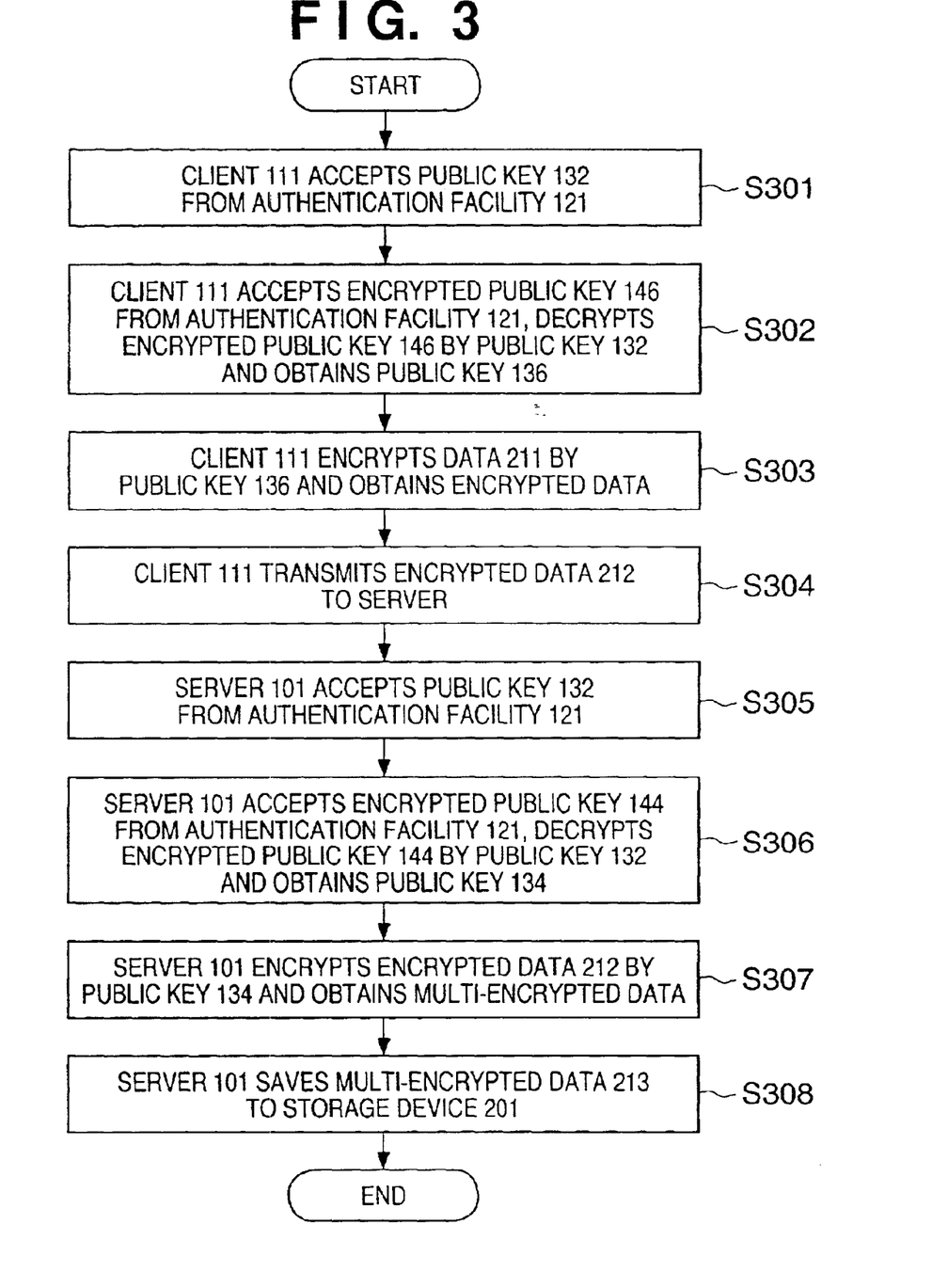
FIG. 3 is a flowchart illustrating the flow of data registration processing.

FIG. 3 is a flowchart illustrating the flow of processing when the server 101 is requested to manage the data by the client 111.

First, the client 111 accepts the public key 132 for the authentication facility 121 from the authentication facility 121(step S301). The public key 132 is utilized in the decryption of a encrypted key that has been encrypted by the private key 131 of the authentication facility 121.

Next, the client 111 accepts the encrypted public key 146 for the client 111 from the authentication facility 121, decrypts the encrypted public key 146 using the public key 132 for the authentication facility 121 acquired at step S301 and obtains the public key 136 for the client 111 (step S302).

Next, the client 111 encrypts the data 211 using the decrypted public key 136 at step S302 to thereby create encrypted data 212 (step S303).

And the client 111 transmits the encrypted data 212 to the server 101 (step S304).

The server 101 that has received the encrypted data 212 accepts the public key 132 from the authentication facility 121 (step S305).

Further the server 101 receives the encrypted public key 144 for the server 101 from the authentication facility 121, decrypts the encrypted public key 144 using the public key 132 acquired at step S305 and obtains the public key 134 for the server (step S306).

The server 101 then encrypts the encrypted data 212 again by the decrypted public key 134 at step S306 to create multi-encrypted data 213 (step S307) and saves the multi-encrypted data 213 in the storage device 201 (step S308).

Figure 5:
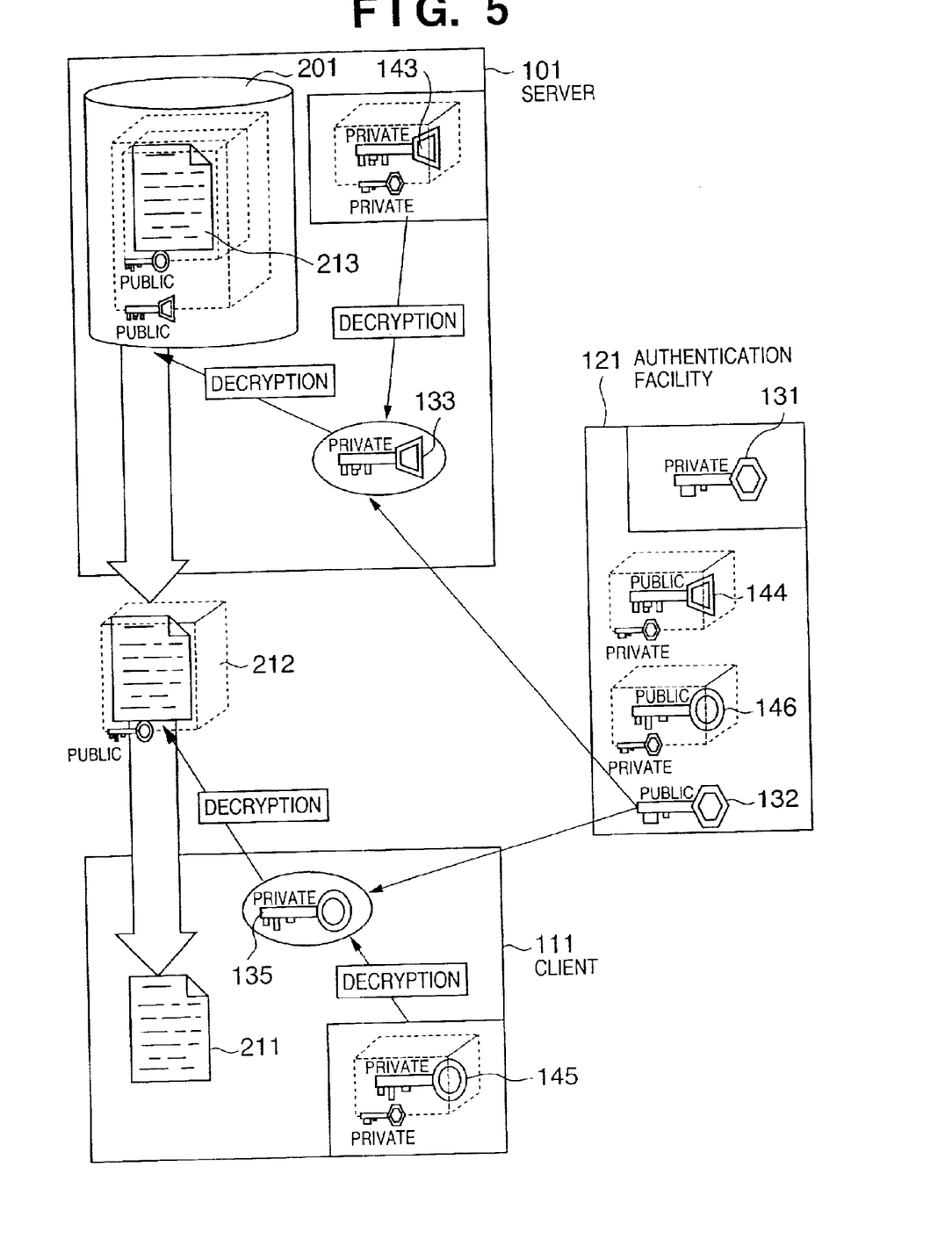
FIG. 5 is a diagram useful in describing data extraction processing.

FIG. 5 is a diagram illustrating processing executed when the client 111 requests the server 101 to extract data.

In FIG. 5, the server 101, client 111, authentication facility 121, the private and public keys 131 to 136 and the encrypted public and private keys 143 to 146 are the same as those described above in connection with FIG. 1. Further, the storage device 201, data 211, encrypted data 212 and multi-encrypted data 213 are the same as those described above in connection with FIG. 2.

Figure 4:
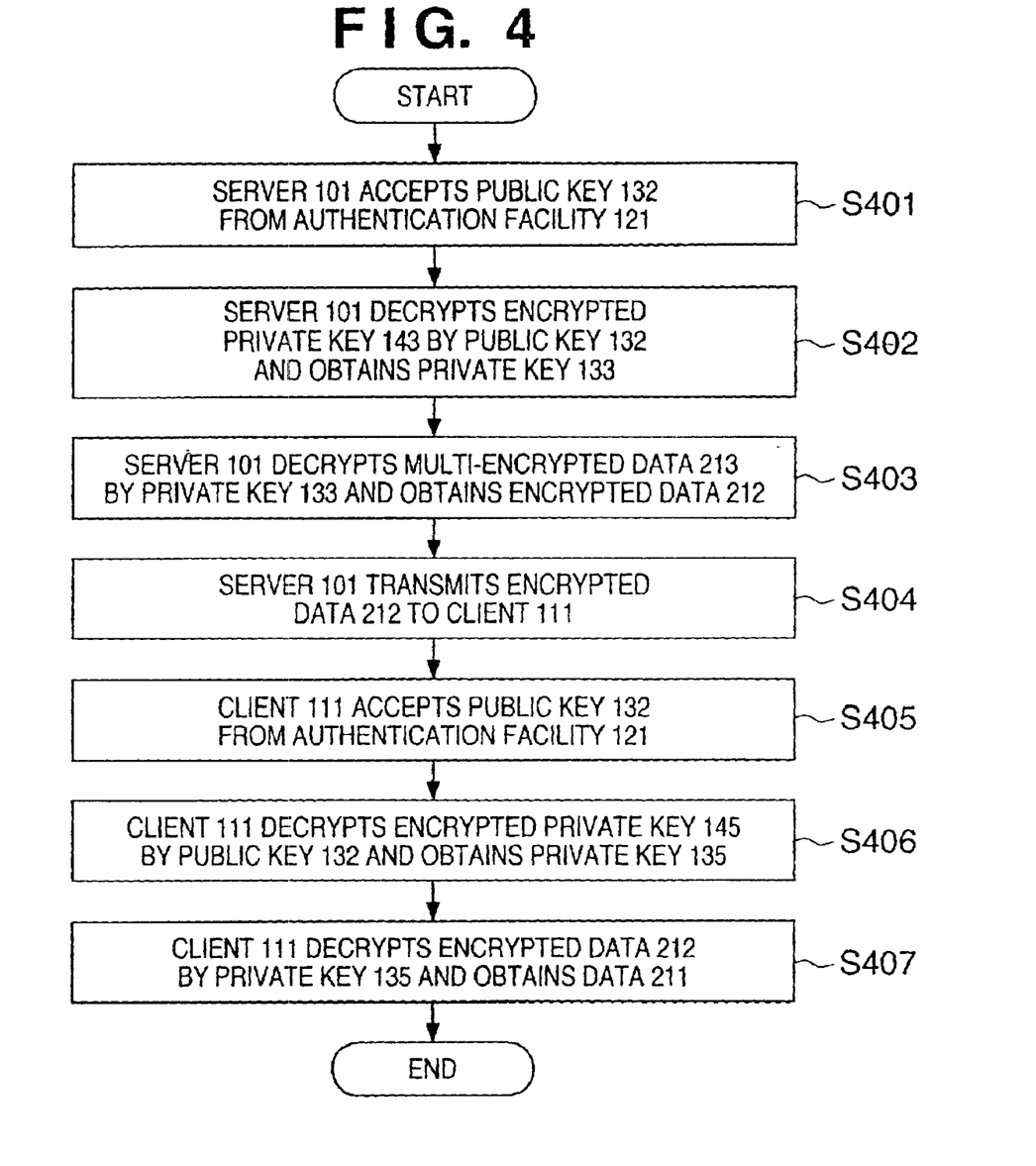
FIG. 4 is a flowchart illustrating the flow of data extraction processing.

Processing for returning the multi-encrypted data 213, which is being managed by the server 101, to the client 111 will be described with reference to the flow chart of FIG. 4.

First, the server 101 accepts the public key 132 for the authentication facility 121 from the authentication facility 121 (step S401).

The server 101 decrypts the encrypted private key 143 for the server 101 by the public key 132 acquired at step S401 and obtains the private key 133 for the server 101 (step S402).

Next, the server 101 extracts the multi-encrypted data 213 from the storage device 201, decrypts the multi-encrypted data 213 by the private key 133 for the server 101 to restore the encrypted data 212(step S403) and the server 101 sends the encrypted data 212 to the client 111 (step S404).

The client 111 that has accepted the encrypted data 212 receives the public key 132 from the authentication facility 121 (step S405). And the client 111 decrypts the encrypted private key 145 using the public key 132 acquired at step S405 and obtains the private key 135 for the client 111(step S406).

Next, the client 111 decrypts the encrypted data 212 by the private key 135 acquired at step S406 for the client to thereby obtain the data 211 (step S407).

Note that the above-described processing in the present embodiment is performed by a device which is provided from a sufficiently reliable provider such as an independent authentication organization and which realizes a program execution format or equivalent function.

The device to realize the program execution format or equivalent function performs control such that in the server 101, when the private key 133 for the server 101 is generated, the public key 132 for the authentication facility 121 is immediately discarded. Further, the generated private key 133 is held only inside the memory, and it is discarded from the memory when decryption of the multi-encrypted data 213 has been completed.

This control prevents unauthorized duplication of the public key 132 for the authentication facility 121 by the server 101. Further, the private key 133 is only temporarily used.

Further, it may be arranged such that when the decryption of the multi-encrypted data 213 has been completed, the authentication facility 121 again transmits the encrypted private key 143 to the server 101, so as to write the private key 143 over the generated private key 133.

Further, it may be arranged such that every time the processing as described in the present embodiment has been completed, the authentication facility 121 transmits a new encrypted private key 143 to the server 101, and the server 101 side writes the new encrypted private key 143 over the stored encrypted private key 143. In this case, the security can be further improved.

Further, the above-described processing can be applied to the private key 135 for the client 111.

Note that in a case where the provider supplies a program execution format, the program execution format may be supplied prior to the above-described processing of the present embodiment, or transmitted with the public key 132 from the server 101 in the above-described processing.

Further, in a case where the provider supplies a device, the device is supplied prior to the above-described processing of the present embodiment. Further, it may be arranged such that the device is set to be inoperative upon elapse of predetermined period, and when the device becomes inoperative, it is exchanged with a new device.

As described above, in the data management system of the present invention, data is encrypted by a public key for the client on the user side requesting data management, and the encrypted data is transmitted to the server of the management side. By this arrangement, a server or any other device, which does not have the private key which pairs off with the public key for the client, cannot decrypt the encrypted data. Thus data tapping can be prevented.

Further, in the data management system of the present invention, data received from the client on the user side is encrypted by the public key for the server on the management side and the encrypted data is stored. By this arrangement, even if a client which does not have the private key which pairs off with the public key for the server obtains the encrypted data without authorization, the client cannot decrypt the data. Accordingly, in a case where data management service is chargeable, a user's illegal data acquisition without payment to the management side can be prevented.

Second Embodiment

Next, processing to discard data managed by the management side in the above-described data management system will be described in detail below.

The server 101 on the management side requires the authentication facility 121 to discard the public key 132 for the authentication facility. Then the authentication facility 121 discards the public key 132. Note that it may be arranged such that the public key 132 is not discarded but the public key 132 is changed into an unavailable state.

Further, it may be arranged such that the client 111 on the user side requires the authentication facility 121 to discard the public key 132.

When the public key 132 is discarded, the private key 133 for the server cannot be referred to, thus the encrypted data 212 cannot be obtained by decrypting the multi-encrypted data 213. Further, since the private key 135 for the client cannot be referred to, the data 211 cannot be obtained by decrypting the encrypted data 212. That is, the data cannot be referred to by discarding the public key 132, therefore, the disposal of the public key is equivalent to the disposal of the data.

Further, the user, who required the management side to discard the data, and the management side, can verify the completion of the disposal of the data, by checking whether or not the public key 132 can be referred to by accessing the authentication facility.

As described above, according to the data management system of the present invention, data can be reliably discarded by discarding a public key for the authentication facility, and further, the disposal of the data can be verified.

Other Embodiments

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes. In this case, the program codes read from the storage medium implement the novel functions of the embodiment and the storage medium storing the program codes constitutes the invention. Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process in accordance with the designation of program codes and implements the function of the above embodiment.

In a case where the present invention is applied to the above-mentioned storage medium, program code corresponding to the flowcharts (shown in FIG. 3 and/or FIG. 4) described earlier would be stored on the storage medium.

Thus, as described above, the present invention is such that in the handling of electronic data exchanged by devices connected over a network, a key for encryption and a key for decryption are generated and multiple encryption is performed by the individual keys on the data transmitting and receiving sides, thereby placing a restraint on the freedom with which the data an be copied, disclosed and discarded. This makes it possible to protect the data. A device on the network can approach the data with the use of the keys managed by the authentication facility.

By not allowing the use of the keys managed by the authentication facility, it becomes impossible to approach the data over the network and the discarding of the data is assured.

As a result, data can be managed over a network with a high level of security.

As many apparently widely different embodiments of the present invention can be made without departing from the spirit and scope thereof, it is to be understood that the invention is not limited to the specific embodiments thereof except as defined in the appended claims.

What is claimed is:

1. A data management system for managing data on a network comprising:

an authentication management device that encrypts a key for client device and a key for server device by using a key for authentication management device;

a client device that transmits first encrypted data obtained by encrypting said data by using said key for client device; and a server device that generates second encrypted data by encrypting said first encrypted data received from said client device, by using said key for server device;

wherein said client device and said server device respectively decrypt said key for client device or said key for server device by using said key for authentication management device, and use the decrypted key for encrypting said data or said first encrypted data.

2. The data management system according to claim 1, wherein said key for authentication management device is a public key for authentication management device and a private key for authentication management device in a public key cryptosystem, and wherein said key for client device and said key for server device encrypted by using said private key for authentication management device are decrypted by using said public key for authentication management device.

3. The data management system according to claim 1, wherein said key for client device is a public key for client device and a private key for client device in a public key cryptosystem, and wherein said first encrypted data obtained by encrypting said data by using said public key for client device is decrypted by using said private key for client device.

4. The data management system according to claim 1, wherein said key for server device is a public key for server device and a private key for server device in a public key cryptosystem, and wherein said second encrypted data obtained by encrypting said first encrypted data by using said public key for server device is decrypted by using said private key for server device.

5. The data management system according to claim 1, wherein said authentication management device has control means for disabling reference to said key for authentication management device by said client device and said server device.

6. An information processing apparatus capable of communicating with authentication management means holding a key for authentication management means, comprising:
   acquisition means for acquiring an encrypted key encrypted by using said key for authentication management means;
   reference means for referring to said key for authentication management means;
   decryption means for decrypting said encrypted key to a key by using said key for authentication management means referred to by said reference means; and
   encryption means for encrypting data by using the key decrypted by said decryption means.

7. The information processing apparatus according to claim 6, further comprising transmission means for transmitting the encrypted data encrypted by said encryption means to another information processing apparatus.

8. The information processing apparatus according to claim 7, further comprising storage means for storing the encrypted data encrypted by said encryption means.

9. The information processing apparatus according to claim 6, wherein said key for authentication management means is a public key for authentication management means and a private key for authentication management means in a public key cryptosystem, and wherein said encrypted key encrypted by using said private key for authentication management means is decrypted to the key by using said public key for authentication management means.

10. The information processing apparatus according to claim 6, wherein said key is a public key and a private key in a public key cryptosystem, and wherein said encryption means encrypts said data into encrypted data by using said public key and said encrypted data is decrypted to said data by using said private key.

11. The information processing apparatus according to claim 6, wherein said authentication management means disables reference to said key for authentication management means by said reference means.

12. An authentication management apparatus capable of communicating with an information processing apparatus for transmitting/receiving data, comprising:
   holding means for holding a key for authentication management apparatus;
   encryption means for encrypting a key for information processing apparatus to an encrypted key for information processing apparatus by using said key for authentication management apparatus held by said holding means; and
   transmission means for transmitting the encrypted key for information processing apparatus encrypted by said encryption means to said information processing apparatus;
   wherein said information processing apparatus decrypts said received encrypted key for information processing apparatus to a key for said information processing apparatus by using said key for authentication management apparatus, and encrypts said data by using said decrypted key for information processing apparatus.

13. The authentication management apparatus according to claim 12, wherein said key for authentication management apparatus is a public key for authentication management apparatus and a private key for authentication management apparatus in a public key cryptosystem, and wherein said key for information processing apparatus is encrypted to said encrypted key for information processing apparatus by using said private key for authentication management apparatus, and said encrypted key for information processing apparatus is decrypted to said key for information processing apparatus by using said public key for authentication management apparatus.

14. The authentication management apparatus according to claim 12, wherein said key for information processing apparatus is a public key for information processing apparatus and a private key for information processing apparatus in a public key cryptosystem, and wherein the data encrypted by using said public key for information processing apparatus is decrypted by using said private key for information processing apparatus.

15. The authentication management apparatus according to claim 12, further comprising control means for disabling reference to said key for authentication management apparatus by said information processing apparatus.

16. A data management method for managing data on a network comprising:
   an authentication management step of encrypting a key for client step and a key for server step by using a key for authentication management step;
   a client step of transmitting first encrypted data obtained by encrypting said data by using said key for client step; and
   a server step of generating second encrypted data by encrypting said first encrypted data received from said client step, by using said key for server step;
   wherein at said client step and said server step, said key for client device or said key for server device is decrypted by using said key for authentication management step, and the decrypted key is used for encrypting said data or said first encrypted data.

17. A control method for an information processing apparatus capable of communicating with an authentication management step of holding a key for authentication management step, comprising:

an acquisition step of acquiring an encrypted key encrypted by using said key for authentication management step;

a reference step of referring to said key for authentication management step;

a decryption step of decrypting said encrypted key to a key by using said key for authentication management step referred to at said reference step; and an encryption step of encrypting data by using the key decrypted at said decryption step.

18. A control method for an authentication management apparatus capable of communicating with an information processing apparatus for transmitting/receiving data, comprising:

a holding step of holding a key for authentication management apparatus;

an encryption step of encrypting a key for information processing apparatus to an encrypted key for information processing apparatus by using said key for authentication management apparatus held at said holding step; and a transmission step of transmitting the encrypted key for information processing apparatus encrypted at said encryption step to said information processing apparatus;

wherein said information processing apparatus decrypts said received encrypted key for information processing apparatus to a key for said information processing apparatus by using said key for authentication management apparatus, and encrypts said data by using said decrypted key for information processing apparatus.

19. A storage medium holding a program for executing a data management method for managing data on a network, comprising:

a program having:

an authentication management step of encrypting a key for client step and a key for server step by using a key for authentication management step;

a client step of transmitting first encrypted data obtained by encrypting said data by using said key for client step; and a server step of generating second encrypted data by encrypting said first encrypted data received from said client step, by using said key for server step;

wherein at said client step and said server step, said key for client device or said key for server device is decrypted by using said key for authentication management step, and the decrypted key is used for encrypting said data or said first encrypted data.

20. A storage medium holding a program for executing a control method for an information processing apparatus capable of communicating with an authentication management step of holding a key for authentication management step, comprising:

a program having:

an acquisition step of acquiring an encrypted key encrypted by using said key for authentication management step;

a reference step of referring to said key for authentication management step;

a decryption step of decrypting said encrypted key to a key by using said key for authentication management step referred to at said reference step; and an encryption step of encrypting data by using the key decrypted at said decryption step.

21. A storage medium holding a program for executing a control method for an authentication management apparatus capable of communicating with an information processing apparatus for transmitting/receiving data, comprising:

a program having:

a holding step of holding a key for authentication management apparatus;

an encryption step of encrypting a key for information processing apparatus to an encrypted key for information processing apparatus by using said key for authentication management apparatus held at said holding step; and a transmission step of transmitting the encrypted key for information processing apparatus encrypted at said encryption step to said information processing apparatus;

wherein said information processing apparatus decrypts said received encrypted key for information processing apparatus to a key for said information processing apparatus by using said key for authentication management apparatus, and encrypts said data by using said decrypted key for information processing apparatus.

* * * * *